(12) United States Patent
Bae

(10) Patent No.: US 10,540,315 B2
(45) Date of Patent: Jan. 21, 2020

(54) COMPUTING SYSTEMS RELATING TO SERIAL AND PARALLEL INTERFACING OPERATIONS

(71) Applicant: SK hynix Inc., Icheon-si, Gyeonggi-do (KR)

(72) Inventor: Hyung Seob Bae, Seoul (KR)

(73) Assignee: SK hynix Inc., Icheon-si, Gyeonggi-do (KR)

( * ) Notice: Subject to any disclaimer, the term of this patent is extended or adjusted under 35 U.S.C. 154(b) by 79 days.

(21) Appl. No.: 15/870,169

(22) Filed: Jan. 12, 2018

(65) Prior Publication Data

US 2018/0307647 A1  Oct. 25, 2018

(30) Foreign Application Priority Data

Apr. 21, 2017  (KR) .................. 10-2017-0051544

(51) Int. Cl.
*G06F 13/00* (2006.01)
*G06F 13/42* (2006.01)
*G06F 13/16* (2006.01)
*G06F 11/10* (2006.01)
*G06F 15/78* (2006.01)

(52) U.S. Cl.
CPC ......... *G06F 13/4239* (2013.01); *G06F 11/10* (2013.01); *G06F 13/1673* (2013.01); *G06F 13/4243* (2013.01); *G06F 15/7807* (2013.01)

(58) Field of Classification Search
None
See application file for complete search history.

(56) References Cited

U.S. PATENT DOCUMENTS

| | | | |
|---|---|---|---|
| 6,591,310 B1* | 7/2003 | Johnson | G06F 13/387 710/3 |
| 7,571,067 B2 | 8/2009 | Sedeh | |
| 2006/0069884 A1* | 3/2006 | Kim | H04L 12/2812 711/154 |
| 2007/0245093 A1* | 10/2007 | Do | G11C 7/1012 711/149 |
| 2008/0209089 A1* | 8/2008 | Mo | G06F 13/385 710/71 |
| 2011/0035627 A1* | 2/2011 | Jeon | G06Q 50/22 714/25 |
| 2017/0132067 A1* | 5/2017 | Singaravelu Vanaja | G06F 11/0778 |
| 2017/0269875 A1* | 9/2017 | Kim | G06F 3/0659 |

* cited by examiner

*Primary Examiner* — Daniel F. McMahon
(74) *Attorney, Agent, or Firm* — William Park & Associates Ltd.

(57) ABSTRACT

A computing system is provided. The computing system includes a host device and a plurality of interface devices. The plurality of interface devices is configured to communicate with the host device through a host bus. Each of the plurality of interface devices is configured to perform an interfacing operation between the host device and a memory device. The interfacing operation includes a serial interfacing operation and a parallel interfacing operation.

16 Claims, 2 Drawing Sheets

COMPUTING SYSTEMS RELATING TO SERIAL AND PARALLEL INTERFACING OPERATIONS

CROSS-REFERENCE TO RELATED APPLICATIONS

The present application claims priority under 35 U.S.C 119(a) to Korean Application No. 10-2017-0051544, filed on Apr. 21, 2017, which is herein incorporated by references in its entirety.

BACKGROUND

1. Technical Field

Various embodiments of the present disclosure generally relate to computing systems and, more particularly, to computing systems relating to serial and parallel interfacing operations.

2. Related Art

Development of low cost, compact and high performance integrated circuits have allowed for the realization of portable computing systems having relatively complicated functions. These portable computing systems may include not only laptop computers, notebook computers and tablet computers but also smart phones, portable audio devices, portable video devices and portable video game consoles. However, as the portable computing systems are reduced in size, location sizes for hardware components of the portable computing systems have been reduced. As a result, it becomes more and more important to design the hardware components to optimize the architecture of the portable computing systems.

Recently, cloud computing systems have been proposed to store various software programs and data. The cloud computing systems may be very attractive because any work can be performed with one of various terminals such as personal computers, mobile phones or smart phones, which are connected to the networks of the cloud computing systems, in any place. Accordingly, extendibility and large capacity of the cloud computing systems may be required to upgrade and improve the performance of the cloud computing systems according to users' demands. In addition, if the cloud computing systems are used, it may be necessary to efficiently process data through various interfaces, for example, homogeneous interfaces as well as heterogeneous interfaces for fast and reliable communication between the cloud computing system and users' terminals.

SUMMARY

According to an embodiment, a computing system may be provided. The computing system may include a host device and a plurality of interface devices. The plurality of interface devices may be configured to communicate with the host device through a host but. Each of the plurality of interface devices may be configured to perform an interfacing operation between the host device and a memory device. The interfacing operation may include a serial interfacing operation and a parallel interfacing operation.

DETAILED DESCRIPTION

In the following description of the embodiments, it will be understood that the terms "first" and "second" are intended to identify an element, but not used to define only the element itself or to mean a particular sequence. In addition, when an element is referred to as being located "on", "over", "above", "under" or "beneath" another element, it is intended to mean relative position relationship, but not used to limit certain cases that the element directly contacts the other element, or at least one intervening element is present therebetween. Accordingly, the terms such as "on", "over", "above", "under", "beneath", "below" and the like that are used herein are for the purpose of describing particular embodiments only and are not intended to limit the scope of the present disclosure. Further, when an element is referred to as being "connected" or "coupled" to another element, the element may be electrically or mechanically connected or coupled to the other element directly, or may form a connection relationship or coupling relationship by replacing the other element therebetween.

Various embodiments may be directed to computing systems performing combined serial and parallel interfacing operations.

Figure 1:
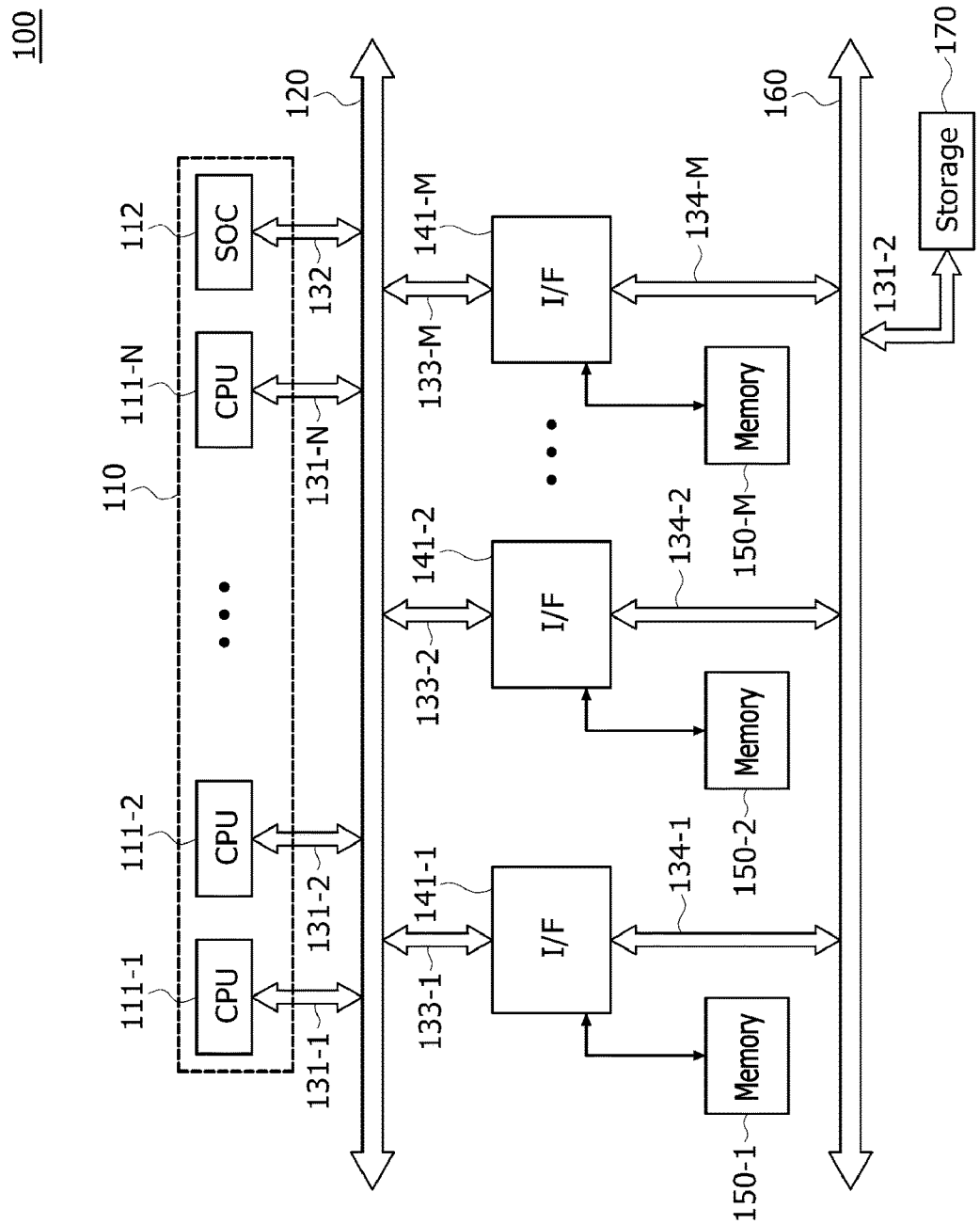
FIG. 1 is a block diagram illustrating a computing system according to an embodiment of the present disclosure.

FIG. 1 is a block diagram illustrating a computing system 100 configured for performing a combined serial and parallel interfacing operation according to an embodiment of the present disclosure. Referring to FIG. 1, the computing system 100 according to an embodiment may include a host device 110, a host bus 120, a plurality of interface devices (I/F) (e.g., first to $M^{th}$ interface devices 141-1, 141-2, . . . , and 141-M), a plurality of main memories (e.g., first to $M^{th}$ main memories 150-1, 150-2, . . . , and 150-M), and a system bus 160. The host device 110 may include a plurality of central processing units (CPUs) (e.g., first to $N^{th}$ CPUs 111-1, 111-2, . . . , and 111-N). The first to $N^{th}$ CPUs 111-1, 111-2, . . . , and 111-N may constitute a multi-core processor that independently operates each other. Each of the first to $N^{th}$ CPUs 111-1, 111-2, . . . , and 111-N may include a plurality of cores. In an embodiment, the host device 110 may include a single CPU. The host device 110 may include a system on chip (SOC) 112. The SOC 112 may include a graphic processor, a memory and a CPU which are integrated in a single silicon chip. The first to $N^{th}$ CPUs 111-1, 111-2, . . . , and 111-N may be connected to the host bus 120 through first to $N^{th}$ sub-buses 131-1, 131-2, . . . , and 131-N, respectively. The first to $N^{th}$ sub-buses 131-1, 131-2, . . . , and 131-N may constitute a first group of sub-buses. The SOC 112 may be connected to the host bus 120 through another sub-bus 132. The sub-bus 132 may be included in the first group of sub-buses. In an embodiment, for example, the first group of sub-buses may include the first to $N^{th}$ sub-buses 131-1, 131-2, . . . , and 131-N and the sub-bus 132.

The first to $M^{th}$ interface devices 141-1, 141-2, . . . , and 141-M may be connected to the host bus 120 through first to $M^{th}$ sub-buses 133-1, 133-2, . . . , and 133-M, respectively. The first to $M^{th}$ sub-buses 133-1, 133-2, . . . , and 133-M may constitute a second group of sub-buses. For example, the first interface device 141-1 may be connected to the host bus 120 through the first sub-bus 133-1 of the second group of sub-buses, and the second interface device 141-2 may be connected to the host bus 120 through the second sub-bus 133-2 of the second group of sub-buses. Similarly, the $M^{th}$ interface device 141-M may be connected to the host bus 120 through the $M^{th}$ sub-bus 133-M of the second group of sub-buses. Thus, in an embodiment, for example, the second group of sub-buses may include first to $M^{th}$ sub-buses 133-1, 133-2, . . . , and 133-M. Since each of the first to $M^{th}$ interface devices 141-1, 141-2, . . . , and 141-M is independently connected to the host bus 120, the host device 110 may select any one of the first to $M^{th}$ interface devices 141-1, 141-2, . . . , and 141-M to execute an interfacing operation. Alternatively, even though each of the first to $M^{th}$ interface devices 141-1, 141-2, . . . , and 141-M is independently connected to the host bus 120, the host device 110 may simultaneously select at least two of the first to $M^{th}$ interface devices 141-1, 141-2, . . . , and 141-M to execute a plurality of interfacing operations in parallel. For example, an interfacing operation of one of the first to $M^{th}$ interface devices 141-1, 141-2, . . . , and 141-M, which is connected to the first CPU 111-1, may be executed simultaneously with an interfacing operation of another of the first to $M^{th}$ interface devices 141-1, 141-2, . . . , and 141-M, which is connected to the $N^{th}$ CPU 111-N. A configuration of any one of the first to $M^{th}$ interface devices 141-1, 141-2, . . . , and 141-M will be described with reference to FIG. 2 later. In an embodiment, for example, the plurality of interface devices may be configured to communicate with the host device through a single host bus, for example, host bus 120 may be a single host bus.

The first to $M^{th}$ interface devices 141-1, 141-2, . . . , and 141-M may be connected to the system bus 160 through first to $M^{th}$ sub-buses 134-1, 134-2, . . . , and 134-M, respectively. The first to $M^{th}$ sub-buses 134-1, 134-2, . . . , and 134-M may constitute a third group of sub-buses. Thus, in an embodiment, for example, the third group of sub-buses may include first to $M^{th}$ sub-buses 134-1, 134-2, . . . , and 134-M. A storage device 170 may be connected to the system bus 160. Although not illustrated in the drawings, peripheral devices other than the storage device 170 may also be connected to the system bus 160. Accordingly, the host device 110 may access to the storage device 170 or at least one of the other peripheral devices through the first to $M^{th}$ interface devices 141-1, 141-2, . . . , and 141-M.

The first to $M^{th}$ main memories 150-1, 150-2, . . . , and 150-M may receive data from the first to $M^{th}$ interface devices 141-1, 141-2, . . . , and 141-M or may transmit data to the first to $M^{th}$ interface devices 141-1, 141-2, . . . , and 141-M through memory buses between the main memories 150-1, 150-2, . . . , and 150-M and the interface devices 141-1, 141-2, . . . , and 141-M. In an embodiment, the first to $M^{th}$ main memories 150-1, 150-2, . . . , and 150-M may be coupled to the first to $M^{th}$ interface devices 141-1, 141-2, . . . , and 141-M, respectively. That is, the first main memory 150-1 may be coupled to the first interface device 141-1, and the second main memory 150-2 may be coupled to the second interface device 141-2. Similarly, the $M^{th}$ main memory 150-M may be coupled to the $M^{th}$ interface device 141-M. Thus, the host device 110 may access to the first main memory 150-1 through the first interface device 141-1 and may access to the second main memory 150-2 through the second interface device 141-2. Similarly, the host device 110 may access to the $M^{th}$ main memory 150-M through the $M^{th}$ interface device 141-M. In an embodiment, the first to $M^{th}$ main memories 150-1, 150-2, . . . , and 150-M may be memory devices having the same function. However, in an embodiment, at least one of the first to $M^{th}$ main memories 150-1, 150-2, . . . , and 150-M may have a different function from the others of the first to $M^{th}$ main memories 150-1, 150-2, . . . , and 150-M. In an embodiment, for example, each main memory 150-1 to 150-M may include a plurality of memories each coupled to the plurality of interface devices 141-1 to 141-M, respectively.

Figure 2:
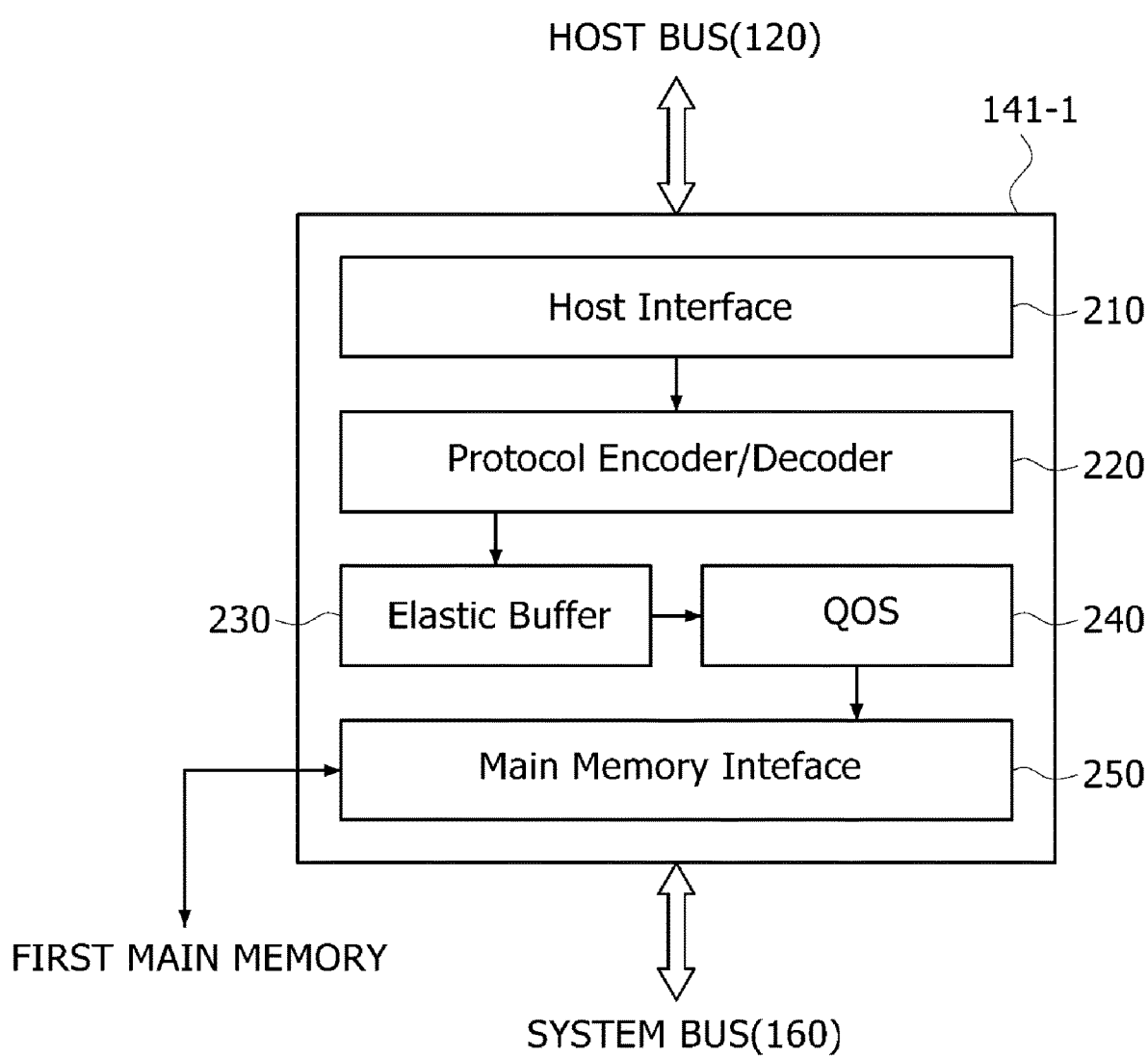
FIG. 2 is a block diagram illustrating one of the interface devices included in the computing system of FIG. 1.

FIG. 2 is a block diagram illustrating the first interface device 141-1 included in the computing system of FIG. 1. In an embodiment, the first to $M^{th}$ interface devices 141-1, 141-2, . . . , and 141-M may have substantially the same configuration. Thus, descriptions of the second to $M^{th}$ interface devices 141-2, . . . , and 141-M will be omitted hereinafter. Referring to FIGS. 1 and 2, the first interface device 141-1 may be configured to include a host interface 210, a protocol encoder/decoder 220, an elastic buffer 230, a QoS (Quality of Service) manager 240 and a main memory interface 250. The first interface device 141-1 having the aforementioned configuration may execute both of a serial interfacing operation and a parallel interfacing operation. In the serial interfacing operation, data transmits as a single stream of bits. In the parallel interfacing operation, several bits of data transmit simultaneously. If the serial interfacing operation is performed by the first interface device 141-1 the host interface 210 operates in serial interfacing mode. In the serial interfacing mode, data transmission between the host interface 210 and the main memory interface 250 may be executed through the protocol encoder/decoder 220, the elastic buffer 230 and QoS manager 240. If the parallel interfacing operation is performed by the first interface device 141-1 and if the host device 110 accesses to the main memory 150-1, the host interface 210 operates in first parallel interfacing mode. In the first parallel interfacing mode, data inputted to the first interface device 141-1 through the host bus 120 may be directly transmitted from the host interface 210 to the main memory interface 250 in the first interface device 141-1. Then, the data from the main memory interface 250 may be transmit to the first main memory 150-1. If the parallel interfacing operation is performed by the first interface device 141-1 and if the host device 110 accesses to the storage device 170 or at least one of the other peripheral devices, the host interface 210 operates in second parallel interfacing mode. In the second parallel interfacing mode, data inputted to the first interface device 141-1 through the host bus 120 may be directly transmitted from the host interface 210 to the outside of the first interface device 141-1 without passing through the main memory interface 250. Then, the data from the main memory interface 250 may be transmit to the storage device 170 or the other peripheral devices through the sub-bus 134-1 and the system bus 160. In contrast, if the host interface 210 executes the serial interfacing operation, the data may be transmitted from the host interface 210 to the outside of the first interface device 141-1 through the protocol encoder/decoder 220, the elastic buffer 230 and QoS manager 240.

The host interface 210 may perform an interfacing operation to communicate with the host device 110. The host interface 210 may be configured to be able to perform both of the serial interfacing operation and the parallel interfacing operation. In an embodiment, if the host interface 210 performs the serial interfacing operation for communication between the host device 110 and the first main memory 150-1, data may be transmitted from the host interface 210 to the main memory interface 250 through the protocol encoder/decoder 220, the elastic buffer 230 and QoS manager 240. In an embodiment, if the host interface 210 performs the parallel interfacing operation for communication between the host device 110 and the first main memory 150-1, data may be directly transmitted from the host interface 210 to the main memory interface 250 without passing through the protocol encoder/decoder 220, the elastic buffer 230 and QoS manager 240. In an embodiment, the host interface 210 performs the serial interfacing operation for communication between the host device 110 and the storage device 170 (or any one of the other peripheral devices), whereby data may be transmitted from the host interface 210 to the storage device 170 (or any one of the other peripheral devices) through the sub-bus 134-1 and the system bus 160.

The protocol encoder and decoder (encoder/decoder) 220 may perform an encoding operation and a decoding operation according to a protocol determined between the host interface 210 and the protocol encoder/decoder 220. For example, if the host interface 210 performs the serial interfacing operation, the protocol encoder/decoder 220 may perform a decoding operation of serial data outputted from the host device 110 according to a predetermined protocol and may transmit the decoded data to the elastic buffer 230. In addition, the protocol encoder/decoder 220 may perform an encoding operation of serial data outputted from the elastic buffer 230 according to a predetermined protocol and may transmit the encoded data to the host device 110. In an embodiment, the encoder/decoder 220 may be implemented with software, hardware, or any combination thereof.

The elastic buffer 230 may buffer the decoded data outputted from the protocol encoder/decoder 220 or may buffer data to be encoded by the protocol encoder/decoder 220. The elastic buffer 230 may buffer the decoded data outputted from the protocol encoder/decoder 220 or the data to be encoded by the protocol encoder/decoder 220 in one mode selected from a synchronous mode and an asynchronous mode. In such a case, the elastic buffer 230 may perform the buffering operation using any one of a first time domain and a second time domain. The first time domain may be applied to the synchronous mode. A length of data may be fixed without variation of a latency in the synchronous mode. The second time domain may be applied to the asynchronous mode. A length of data may vary to cause variation of a latency in the asynchronous mode. In an embodiment, the second time domain may be set as a time domain corresponding to a maximum length of data that variable data can have. In an embodiment, the elastic buffer 230 may be implemented with software, hardware, or any combination thereof. In an embodiment, for example, the second time domain may be set to have a length which is equal to or greater than a maximum length of data in the asynchronous mode.

QoS manager 240 may monitor the data inputted to QoS manager 240 to perform an error correction operation of the data if the data include erroneous bits. If the error correction operation is not required, the first interface device 141-1 may be configured without QoS manager 240. However, a probability that data errors occur may be higher than a certain level due to a design scheme for the fast operation of the host interface 210 and a physical characteristic of the host interface 210. In such a case, the error correction operation performed by QoS manager 240 may be required while the data are transmitted in the first interface device 141-1. In an embodiment, QoS manager 240 may perform the error correction operation using an error correction code (ECC) scheme or a cyclic redundancy checking (CRC) scheme. In an embodiment, QoS manager 240 may be implemented with software, hardware, or any combination thereof.

The protocol encoder/decoder 220, the elastic buffer 230 and QoS manager 240 may constitute a serial data processor. In an embodiment, for example, a serial data processor may include a protocol encoder/decoder 220, an elastic buffer 230. In an embodiment, for example, a serial data processor may include a protocol encoder/decoder 220, an elastic buffer 230 and a service quality monitor 240.

The main memory interface 250 may be connected to the first main memory 150-1 through a memory bus. An interfacing route of the first main memory 150-1 may vary according to whether the data inputted to or outputted from the first main memory 150-1 is serial data or parallel data. During a write operation for storing data into the first main memory 150-1, the interfacing route of the first main memory 150-1 may vary according to whether the data transmitted from the host device 110 to the first main memory 150-1 is serial data or parallel data. During a read operation for reading out data stored in the first main memory 150-1, the interfacing route of the first main memory 150-1 may vary according to whether the data outputted from the first main memory 150-1 is serial data or parallel data.

If the host interface 210 performs the parallel interfacing operation during the write operation of the first main memory 150-1, the main memory interface 250 may directly receive the data from the host interface 210 and may transmit the data to the first main memory 150-1. If the host interface 210 performs the serial interfacing operation during the write operation of the first main memory 150-1, the main memory interface 250 may receive the data from QoS manager 240 and then may transmit the data to the first main memory 150-1. If parallel data are outputted from the first main memory 150-1 during the read operation of the first main memory 150-1, the main memory interface 250 may directly transmit the parallel data to the host interface 210. In contrast, if serial data are outputted from the first main memory 150-1 during the read operation of the first main memory 150-1, the main memory interface 250 may transmit the serial data to QoS manager 240. In an embodiment, the host interface 210 may be implemented with software, hardware, or any combination thereof. In an embodiment, the main memory interface 250 may be implemented with software, hardware, or any combination thereof.

The embodiments of the present disclosure have been disclosed above for illustrative purposes. Those of ordinary skill in the art will appreciate that various modifications, additions, and substitutions are possible, without departing from the scope and spirit of the present disclosure as disclosed in the accompanying claims.

What is claimed is:
1. A computing system comprising:
a host device; and
a plurality of interface devices configured to communicate with the host device through a host bus,
wherein each of the plurality of interface devices is configured to perform an interfacing operation between the host device and a memory device,
wherein the interfacing operation includes a serial interfacing operation and a parallel interfacing operation, and
wherein each of the plurality of interface devices includes:
a host interface configured to perform the serial interfacing operation and the parallel interfacing operation to communicate with the host device;
a serial data processor configured to process serial data if the host interface performs the serial interfacing operation; and
a main memory interface configured to transmit and receive parallel data with the memory device.

2. The computing system of claim 1, wherein the host device is configured to include a single central processing unit.

3. The computing system of claim 1, wherein the host device is configured to include a plurality of central processing units.

4. The computing system of claim 1, wherein the host device is configured to include a system on chip.

5. The computing system of claim 1, wherein the serial data processor includes:
- a protocol encoder and decoder (encoder/decoder) configured to perform a decoding operation of data outputted from the host interface or an encoding operation of data to be transmitted to the host device through the host interface; and
- an elastic buffer is configured to buffer the decoded data outputted from the protocol encoder/decoder or data to be encoded by the protocol encoder/decoder,
- wherein the elastic buffer selectively operates in any one mode of a synchronous mode and an asynchronous mode.

6. The computing system of claim 5, wherein the elastic buffer operates using any one of a first time domain which is applied to the synchronous mode and a second time domain which is applied to the asynchronous mode.

7. The computing system of claim 6, wherein the second time domain is set to have a length which is equal to or greater than a maximum length of data in the asynchronous mode.

8. The computing system of claim 5, wherein the serial data processor further includes a service quality monitor that is coupled between the elastic buffer and the main memory interface to perform an error correction operation on data transmitted through QoS (Quality of Service) manager.

9. The computing system of claim 1, wherein the memory device includes a plurality of memories which are coupled to the plurality of interface devices, respectively.

10. The computing system of claim 1,
wherein each of the plurality of interface devices is configured to perform an interfacing operation between the host device and a storage device or a peripheral device.

11. The computing system of claim 10, wherein each of the plurality of interface devices includes:
- a host interface configured to perform the serial interfacing operation and the parallel interfacing operation to communicate with the host device;
- a serial data processor configured to process serial data if the host interface performs the serial interfacing operation; and
- a main memory interface configured to transmit and receive parallel data with the memory device.

12. The computing system of claim 11, wherein the serial data processor includes:
- a protocol encoder and decoder (encoder/decoder) configured to perform a decoding operation of data outputted from the host interface or an encoding operation of data to be transmitted to the host device through the host interface; and
- an elastic buffer is configured to buffer the decoded data outputted from the protocol encoder/decoder or data to be encoded by the protocol encoder/decoder,
- wherein the elastic buffer selectively operates in any one mode of a synchronous mode and an asynchronous mode.

13. The computing system of claim 12, wherein the elastic buffer operates using any one of a first time domain which is applied to the synchronous mode and a second time domain which is applied to the asynchronous mode.

14. The computing system of claim 13, wherein the second time domain is set to have a length which is equal to or greater than a maximum length of data in the asynchronous mode.

15. The computing system of claim 14, wherein the serial data processor further includes a QoS (Quality of Service) manager that is coupled between the elastic buffer and the main memory interface to perform an error correction operation on data transmitted through QoS (Quality of Service) manager.

16. The computing system of claim 15, wherein the serial data processor further includes a QoS (Quality of Service) manager that is coupled between the elastic buffer and the main memory interface to perform an error correction operation on data transmitted through QoS (Quality of Service) manager.

* * * * *